United States Patent
Fletcher et al.

[11] 3,899,517
[45] Aug. 12, 1975

[54] PERFLUORO ALKYLENE DIOXY-BIS-(4-PHTHALIC ANHYDRIDES AND OXY-BIS-(PERFLUOROALKYLENEOXY-PHTHALIC ANHYDRIDES

[76] Inventors: James C. Fletcher, Administrator of the National Aeronautics and Space Administration, with respect to an invention of James A. Webster, Dayton, Ohio

[22] Filed: July 16, 1974

[21] Appl. No.: 489,008

[52] U.S. Cl. ........... 260/346.3; 260/78 TF; 260/520
[51] Int. Cl.² ........................................ C07D 307/89
[58] Field of Search ................................. 260/346.3

[56] References Cited
UNITED STATES PATENTS
3,310,573    3/1967    Coe.................................. 260/346.3

*Primary Examiner*—Henry R. Jiles
*Assistant Examiner*—Bernard I. Dentz
*Attorney, Agent, or Firm*—W. H. Riggins; L. D. Wofford, Jr.; John R. Manning

[57]       ABSTRACT

Novel dianhydrides having the formula:

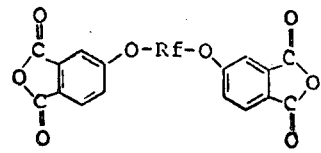

have been found which when reacted with diamines provide polyimides exhibiting excellent thermal, oxidative and hydrolytic stability and good tensile strength and elongation, which characteristics makes the polyimides useful as sealants in advanced aerospace structures.

7 Claims, No Drawings

PERFLUORO ALKYLENE DIOXY-BIS-(4-PHTHALIC ANHYDRIDES AND OXY-BIS-(PERFLUOROALKYLENEOXY-PHTHALIC ANHYDRIDES

ORIGIN OF THE INVENTION

The invention described herein was made in the performance of work under a NASA contract and is subject to the provisions of Section 305 of the National Aeronautics and Space Act of 1958, Public Law 85-868 (72 STAT. 345; 42 U.S.C. 2457).

BACKGROUND OF THE INVENTION

1. Field of the Invention

The present invention relates to novel ether-linked aryl tetracarboxylic acids and dianhydrides and to a method for their preparation.

2. Description of the Prior Art

A very definite need has developed for materials useful in the preparation of sealants in advanced aerospace structures. The major requirement that such sealants must satisfy is the ability to maintain a seal within a fuel tank for an extended period of time, normally up to 25,000 hours, while subjected to a variety of adverse conditions. The conditions include exposure to high and low temperatures (−45°C to 260°C) in the presence of oxygen, hydrocarbon fuel and moisture. These conditions necessitate a high level of thermal, oxidative and hydrolytic stability. In addition, the sealant must also exhibit adequate physical and chemical characteristics including tensile strength and elasticity, good adhesion, and freedom from stress corrosion of titanium alloys. Needless to say the aforementioned requirements of sealants for aerospace are extraordinarily stringent and very few are known which meet the desired properties.

SUMMARY OF THE INVENTION

One object of the invention, therefore, is to provide a novel compound which can be employed to prepare polyimides exhibiting excellent thermal, oxidative and hydrolytic stability and good tensile strength and elongation during exposure to temperatures ranging from −45°C to 260°C.

Another object of the invention is to provide novel ether-linked aryl tetracarboxy anhydrides having utility in the preparation of polyimides of improved fuel resistance, lowered glass transition temperature and improved high temperature capabilities.

Yet another object of the invention is to provide a method for the production of the novel compounds of the invention.

These and other objects of the invention will become apparent from the following description and appended claims.

In accordance with the present invention, there are provided novel compounds of the formula:

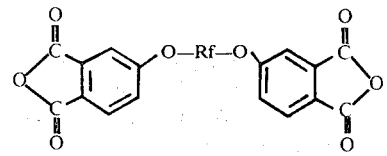

Rf is a perfluoroalkylene having the structure —$(CF_2)_n$— or a perfluoroalkylene ether having the structure —$CF_2)_m$—O—$(CF_2-_m$ wherein $n$ is an integer of 2 to 10, preferably 4 to 6 and $m$ is an integer of 1 to 10, preferably 4 to 6.

DETAILED DESCRIPTION OF THE INVENTION

The compounds of the present invention may be prepared by a series of steps comprising reacting 3,4-bis(trifluoromethyl) phenol and a perfluoroalkanedioyl halide in a molar ratio of at least 2 : 1 to produce the corresponding 3,4-bis(trifluoromethyl)phenyl perfluoroalkanedioate. The 3,4-bis(triflurormethyl) phenyl fluorodialkanoate is then fluorinated to produce 3,3', 4,4'-tetrakis(trifluoromethyl)-α,ω-diphenoxy polyfluoroalkane which is hydrolyzed to the corresponding tetracarboxylic acid. The tetracarboxylic acid thus produced is then dehydrated to the novel dianhydride compounds of the invention. The synthesis of the novel compounds may be outlined as follows:

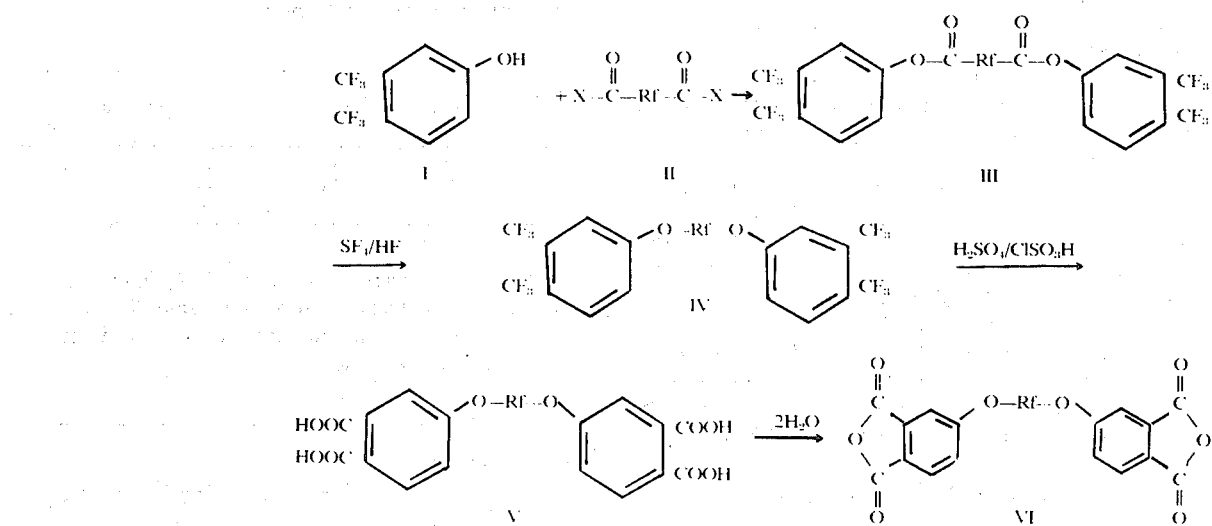

The perfluoroalkanedioyl halide reacted with the 3,3-bis(trifluoromethyl) phenol may be any of the compounds having the structure:

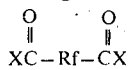

where X = F, Cl, Br and Rf = a perfluoroalkylene, $(CF_2)_n$ or a perfluoroalkylene ether, i.e., $(CF_2)_m-O-(CF_2)_m$ wherein $n$ and $m$ are as defined above. Examples of the perfluoroalkanedioyl halide are perfluoromalonyl chloride, perfluorosuccinyl chloride, perfluoroglutaryl chloride, or fluoride, adipoyl fluoride, etc. The reaction is ordinarily conducted in the presence of an amine catalyst such as pyridine at an elevated temperature, preferably about 75°C to 160°C using a molar ratio of 3,4-bis(trifluoromethyl)phenol to perfluoroalkanedioyl halide of at least 2 to 1.

Fluorination of compound III, i.e., the 3,4-bis(trifluoromethyl)phenyl perfluoroalkanedioate is effected by conventional methods known to convert carboxyl groups to $CF_2$ groups. A convenient method comprises pressurizing an autoclave containing compound III with a stoichiometric excess of sulfur tetrafluoride in admixture with anhydrous hydrogen fluoride and heating the reactant mixture at 80°C – 85°C.

the hydrolysis of the resulting 3,3', 4,4'-tetrakis (trifluoromethyl)-$\alpha$, $\omega$-diphenoxy polyfluoroalkane (Compound IV) is a preferential hydrolysis of the $CF_3$ groups on the aryl ring of compound IV without attack on a perfluoroalkoxy substituent. This preferential hydrolysis may be effected by heating compound IV at temperatures of about 90°C to 120°C in the presence of a mixture of sulfuric acid and chlorosulfonic acid as a hydrolyzing agent.

Any of the conventional methods can be employed for conversion of the tetracarboxylic acid groups containing compound V into the dianhydride. A preferred procedure is to reflux compound V with excess acetic anhydride.

The following example will further illustrate preparation of the novel compounds of the present invention.

EXAMPLE I 3,4-Bis(trifluoromethyl)phenol 3,4-Bis(trifluoromethyl)aniline (24 g, 0.15 mole) was dissolved in 120 ml of concentrated sulfuric acid. A solution prepared by dissolving sodium nitride (12.0 g, 0.174 mole) in 120 ml of cold concentrated sulfuric acid was added to the amine over a period of 75 minutes. The temperature was then permitted to rise to 25°C and stirring was continued for 2 hours. The reaction mixture was then poured over excess ice and the resulting aqueous solution was steam distilled until 2 liters of distillate was collected. Extraction of this aqueous solution with ether and distillation of the extract afforded 19.3 g (80% yield) of 3,4-bis(trifluoromethyl)phenol, bp 116°C/50 torr, $v_D^{25}$ 1.4286.

3,4-Bis(trifluoromethyl)phenyl Hexafluoroglutarate

Pyridine catalyzed reaction of 3,4-bis(trifluoromethyl)phenol (7.8 g, 0.034 mole) with perfluoroglutaryl chloride (4.7 g, 0.017 mole) at 75 to 120°C formed the corresponding diester in 90% yield, bp 155°C/0.15 torr, $v_D^{25}$ 1.4123-28.

3',3'',4', 4''-Tetrakis(trifluoromethyl)-1,5-diphenoxydecafluoropentane

A 300 stainless steel autoclave was charged with 8.0 g (0.012 mole) of 3,4-bis(trifluoromethyl)phenyl hexafluoroglutarate, 38 g (1.9 moles) hydrogen fluoride and 24 g (0.22 mole) sulfur tetrafluoride. The autoclave was heated for 3 hr at 80°C and 21 hr at 85°C. The pressure was released after the autoclave had cooled and the contents was poured over ice and neutralized with $NaHCO_3$. The product was extracted with chloroform, washed and dried. Distillation gave 8.5 g of product considered to be 3',3'', 4',4''-tetrakis(trifluoromethyl)-1,5-diphenoxydecafluoropentane, bp 115°–122°C/0.15 torr, $v_D^{25}$ 1.3895. Infrared analysis showed no carbonyl absorption.

1,5-Diphenoxydecafluoropentane-3',3'',4',4''-tetracarboxylic Acid

A mixture of 3',3'',4',4''-tetrakis(trifluoromethyl)-1,5-diphenoxydecafluoropentane (28.5 g, 0.049 mole), 100% sulfuric acid (25 g, 0.25 mole), and chlorosulfonic acid (29 g, 0.25 mole) was heated with stirring in a flask under a condenser with dry nitrogen atmosphere. The temperature was held at 90°C for 48 hours, 100°C for 16 hours, and 120°C for 24 hours. During this time HCl evolved slowly. The mixture was then poured over ice, extracted with ether, washed, and dried. Evaporation of ether left a brown gummy solid. This was dissolved in 300 ml water at 85°C, decolorized with charcoal, and filtered hot. Upon cooling, 19 g of white solid was collected by filtration, neut. equiv. found 160; calc'd. for tetracarboxylic acid, 153.

This product was refluxed with excess acetic anhydride and then devolatilized. Sublimation of the solid residue at 160°C/ 0.01 torr afforded 17.3 g of dianhydride, mp 94°–97°C (60% yield).

Attempts to purify the dianhydride further by recrystallization failed for lack of a suitable solvent. The anhydride (17.3 g) was finally dissolved in water and recrystallized as the acid, mp 145°–155°C, neut. equiv. 159. The acid was then recrystallized from 27% (by volume) acetic acid/water solution and a second time from 35% acetic acid solution. The melting point was raised to 151°–153° with very little loss in material. Neut. equiv. found 159, calc'd/ 153. NMR analysis showed an equal proportion of labile and aromatic protons suggesting that the tetracarboxylic acid crystallized as the monohydrate with a calculated equivalent weight of 157.5.

The above tetraacid was then converted once again to dianhydride and sublimed. Three fractions of sublimed material were collected.

|  | Weight g | mp °C | Neut. Equiv. Found | Calc'd. |
|---|---|---|---|---|
| 1. | 4.4 | 97–99 | 145.5 | 144.0 |
| 2. | 6.5 | 97.5–99 | 146 |  |
| 3. | 2.9 | 99–100 | — |  |

Titration was carried out by dissolving in excess standard alkali and back titrating with acid. The infrared spectrum and elemental analysis substantiated the structure of the product.

Analysis for $C_{21}H_6F_{10}O_8$

|  | C | H | F |
|---|---|---|---|
| Calc'd | 43.77 | 1.05 | 32.97 |
| Found | 43.53 | 0.96 | 33.10 |

The novel ether-linked aryl tetracarboxy dianhydride of the invention can be reacted with organic diamines to provide valuable polyimides having a variety of applications such as fuel tank sealants, matrix resins for composites, molding resins, films, etc.

Condensation polymers of one diamine in particular and the compounds of the invention, however, has been found to provide polyimides exhibiting an extraordinarily high level of thermal, oxidative and hydrolytic stability. The diamine has the structure:

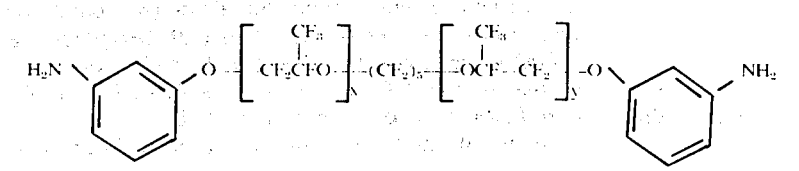

wherein $x$ and $y$ each $= 0$ to 3 and $x + y = 0$ to 3. The diamine may be prepared by the $SF_4$ fluorination of the nitrophenyl ester of a perfluoroalkylene ether dicarboxylic acid, followed by catalytic reduction with hydrogen of the nitro groups to form the diamine. The synthesis may be represented as follows:

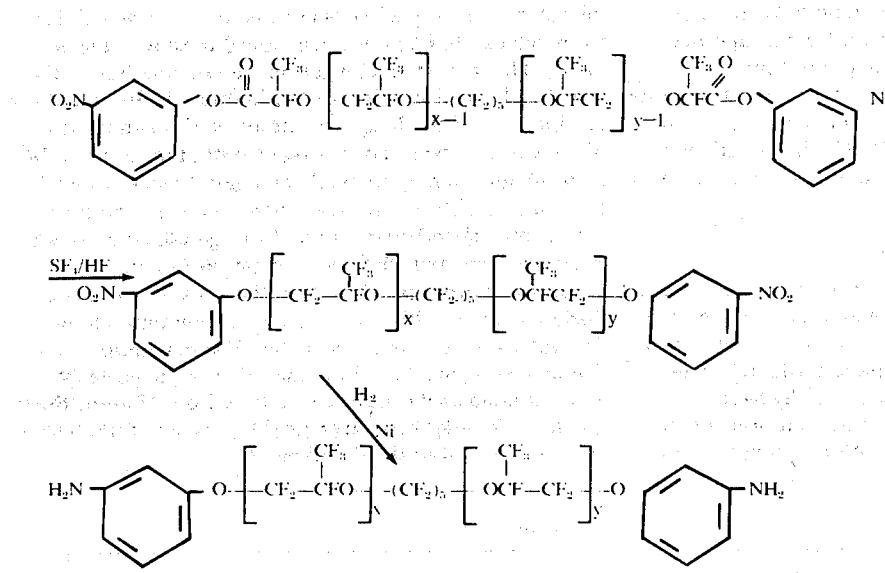

The polyimide polymers produced by the polymerization of ether-linked aryl tetracarboxy dianhydrides of the invention and the above diamine are normally solid non-crosslinked polymers comprised of repeating units having the structure:

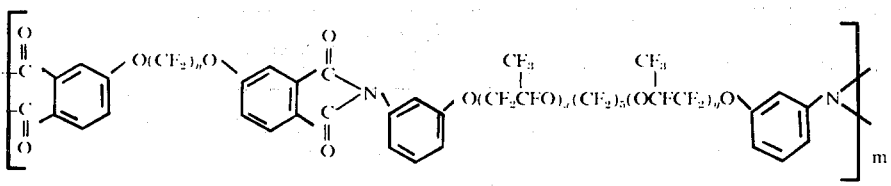

wherein $n$, $x$ and $y$ are as defined above and $m$ is an integer of 1 to 100. Solutions of the polyimides in organic solvents such as acetone or dimethylacetamide can be cast into films which exhibit high strength and elongation. Compression molding of the linear polymers has also been demonstrated.

The above described polyimide polymers may be prepared in a conventional manner (e.g. as described in W. R. Sorenson and T. W. Campbell, "Preparative Methods of Polymer Chemistry,", Interscience Pub. Sec. Ed., 1968, pp. 170) by the addition of the ether-linked aryl tetracarboxy dianhydride of the invention to the diamines dissolved in a mutual solvent such as dimethylacetamide. The diamine and dianhydride reactants are employed in about stoichiometric proportions. Small deviations from 1 : 1 proportions show little apparent changes in physical or chemical properties. In general the initial reaction to form the polyamic acid is carried out at ambient temperatures. Formation of the fluorocarbon polyamic acids takes place more slowly than with conventional polyimides, presumably because of the lower base strengths of the fluorocarbon aromatic diamines. An appreciable increase in solution viscosity becomes apparent only after stirring for over say 10–12 hours whereas with conventional polyimides a maximum viscosity is normally attained within a few hours. Evaporation of solvent and heating to about 150°C to 250°C results in condensation of the polyamic acid to the cyclic imide.

If desired, a small proportion of a trifunctional crosslinking agent can be incorporated in the polyimide to impart high temperature mechanical stability and increased solvent resistance. The resulting crosslinked polyimides are found to exhibit high stability and appreciable tensile strength and elongation at temperatures as high as 300°C. Any of the conventional trifunctional crosslinking agents for polyimides can be employed. A particularly preferred crosslinking agent is mellitic trianhydride. When used, the crosslinking agents are employed in amounts of about 2 to 20 equivalents %, preferably of about 5 to 15 equivalents percent based on the dianhydride employed in the polymerization.

The following examples are included to demonstrate the advantageous polyimides prepared from the novel ether-linked aryl tetracarboxy dianhydrides of the invention.

EXAMPLE II 1,5-Diphenoxydecafluoropentane-3′,3″,4′,4″-tetracarboxylic acid dianhydride (0.144 g, 25 millimole) was added to (0.241 g, 25 millimole) of a diamine having the following structure:

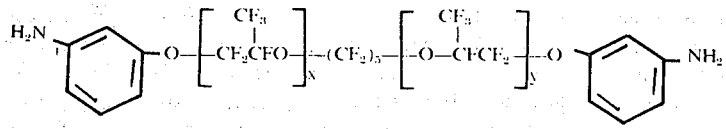

wherein $x + y = 3$ dissolved in 2 ml dimethylacetamide. The solution of polyamic acid, which formed upon reaction at ambient temperature was poured into a film mold and heated at 60°–80° to facilitate evaporation of solvent. The resulting film of polyamic acid was then converted to polyimide that exhibited high strength and elongation, by gradually raising the temperature to 200°C.

EXAMPLE III

Three different polyimide preparations designated A, B and C in Table I below were prepared using the general procedure described in Example II except that about 10 equivalents percent of the ether-linked dianhydride was replaced with mellitic trianhydride as a crosslinking agent. The polyamic acid solution for A and B was stirred 1 hour at 25°C before being poured into the film mold. Polyimide C was prepared with a 2% excess of anhydride. Each of the polyimides was cured by raising the temperature to 200°C over a period of several hours followed by 1 hour or more at 200°C.

The polyimides thus prepared were subjected to tensile strength and elongation measurements which were determined using microtensile test specimens. The specimens were cut with the aid of a non-standard die, similar in shape but smaller than that designated by ASTM procedure D-412-64T. The die dimensions, designated by the ASTM procedure as A, C, L, and W, were 8, 44, 17 and 2.6 mm, respectively.

The tensile strength measurements carried out using microtensile test specimens approximate but may differ from values obtained using standard tensile test specimens. The reported elongation values are based on crosshead travel because of the inability to use an extensiometer. If the length of the necked-down portion of the die is considered in gauge length, the results will be too high when appreciable elongation occurs within the entire length of the specimen, between the grips. On the other hand, inspection of elongated, cold drawn specimens showed that the elongation of some specimens occurred primarily within the necked-down portion. Because of this, maximum and minimum elongation values are shown in the Table. The maximum elongation results are based on the 17 mm gauge length, and minimum values are those based on 23 mm, the specimen length between grips. The results of the tests are summarized in the following Table I.

Table 1

TENSILE STRENGTH AND ELONGATION OF POLYIMIDE

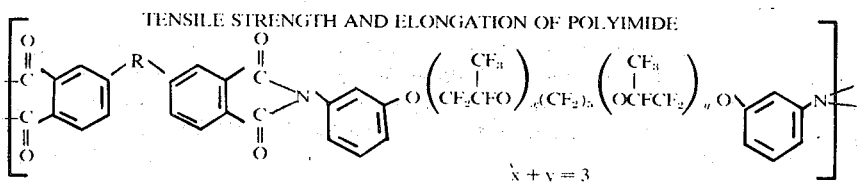

$x + y = 3$

Composition (Equiv. Fraction of Reactants)

| COMPOSITION | Anhydride, R = O(CF$_2$)$_5$O | Amine x + y = 3 | Mellitic Trianhydride |
|---|---|---|---|
| A | 0.9 | 1.0 | 0.1 |
| B | 0.9 | 1.0 | 0.1 |
| C | 0.92 | 1.0 | 0.1 |

| COMPOSITION | Cure Temp. °C | Cure Time hr. | Test Temp. °C | Tensile Strength, psi | % Elongation 23 mm gauge | % Elongation 17 mm gauge |
|---|---|---|---|---|---|---|
| A | 200 | 4 | −43[3] | 5900 | 60 | 80 |
|   |     |   | 25[2]  | 5200 | 230 | 320 |
|   |     |   | 288[2] | 165  | 70  | 100 |
| B | 200 | 1 | −43[2] | 7000 | 140 | 190 |
|   |     |   | 25[2]  | 8500 | 290 | 400 |
|   |     |   | 288[2] | 190  | 50  | 65  |
| C | 190 | 66| −43[2] | 7300 | 130 | 180 |
|   |     |   | 25[2]  | 6100 | 300 | 420 |
|   |     |   | 288[2] | 130  | 50  | 70  |

[2] Two specimens
[3] Three specimens

The test data demonstrate the high tensile strength and elongation at elevated temperatures possessed by the crosslinked polyimides. The properties of polymer C prepared with 2% excess anhydride were not significantly different from polymer B.

EXAMPLE IV

The polyimide C was subjected to Chevron A-50 jet fuel under the conditions shown in Table II and the tensile strengths and elongations were determined before and after exposure. The results are set forth in Table II.

Table II

POLYIMIDE STABILITY

| Polymer Composition | Exposure Conditions | Tensile Strength, psi | Elongation % (17 mm gauge) |
|---|---|---|---|
| C | none | 6100 | 420 |
|   | 200 hr, 288°C, fuel vapor at 15 psia | 4500 | 810 |
|   | 64 hr, 180°C, reflux fuel, air | 4400 | 730 |

Polymer C exposed to fuel vapor at atmospheric pressure for 200 hours at 288°C showed a significant increase in elongation with a moderate decrease in tensile strength. Similar properties were observed after a specimen of the polyimide was refluxed in fuel for 64 hours at 180°C while exposed to air.

EXAMPLE V

The adhesion of films of the polyimides of Example III to stainless steel and titanium metal were investigated. The metal specimens were cleaned and then coated with the polyimide polymer composition and cured at 180°C. The strips were then refluxed for 70 hours in Chevron A-50 jet fuel at 180°C under a nitrogen atmosphere except for one example which was carried out in contact with air.

The results were good adhesion and resistance to refluxing jet engine fuel.

It is claimed:

1. A dianhydride having the formula:

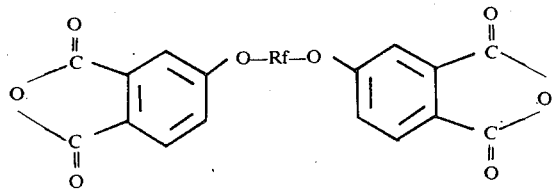

wherein Rf is a perfluoroalkylene having the structure $+CF_2+_n$ or a perfluoroalkylene ether having the structure $+CF_2+_m-O-(CF_2+_m$ wherein $n$ is an integer of 2 to 10, and $m$ is an integer of 1 to 10.

2. A compound as claimed in claim 1 wherein Rf is $+CF_2+_n$ and $n$ is an integer of 4 to 6.

3. A compound as claimed in claim 2 wherein $n$ is 5.

4. A method for the preparation of a dianhydride having the formula:

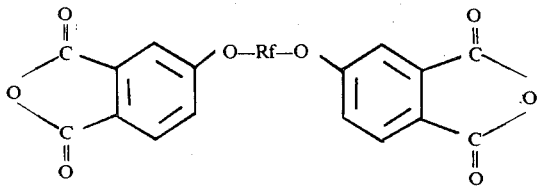

which comprises reacting 3,4-bis(trifluoromethyl) phenol and a perfluoroalkanedioyl halide having the structure:

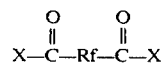

wherein X is selected from F, Cl and Br, Rf is $+CF_2+_n$ or $+CF_2+_m-O-(CF_2+_m$ wherein $n$ is an integer of 2 to 10 and m is an integer of 1 to 10 in a molar ratio of at least 2:1 to produce the corresponding 3,4-bis(trifluoromethyl)phenol perfluoroalkanedioate, fluorinating said 3,4-bis(trifluoromethyl)phenyl perfluoroalkanedioate to produce the corresponding 3, 3', 4, 4'-tetrakis(trifluoromethyl)-α,ω-diphenoxy polyfluoroalkane, hydrolyzing said 3,3',4,4'-tetrakis(trifluoromethyl)-α,ω-diphenoxy polyfluoroalkane to the corresponding to 3,3',4,4'-tetracarboxylic acid-α,ω-'diphenoxy polyfluoroalkane and dehydrating said tetracarboxylic acid to produce the dianhydride.

5. The method of claim 4 wherein the perfluoroalkanedioyl halide has the structure:

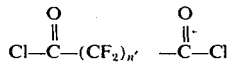

wherein $n'$ is 2–4.

6. The method of claim 5 wherein $n'$ is 3.

7. The method of claim 4 wherein the hydrolysis is conducted at about 90°C to 120°C in the presence of a mixture of sulfuric acid and chlorosulfonic acid as a hydrolyzing agent.

* * * * *